Oct. 4, 1966  F. SINGER  3,276,338
PHOTOGRAPHIC CAMERA
Filed June 5, 1963  2 Sheets-Sheet 1

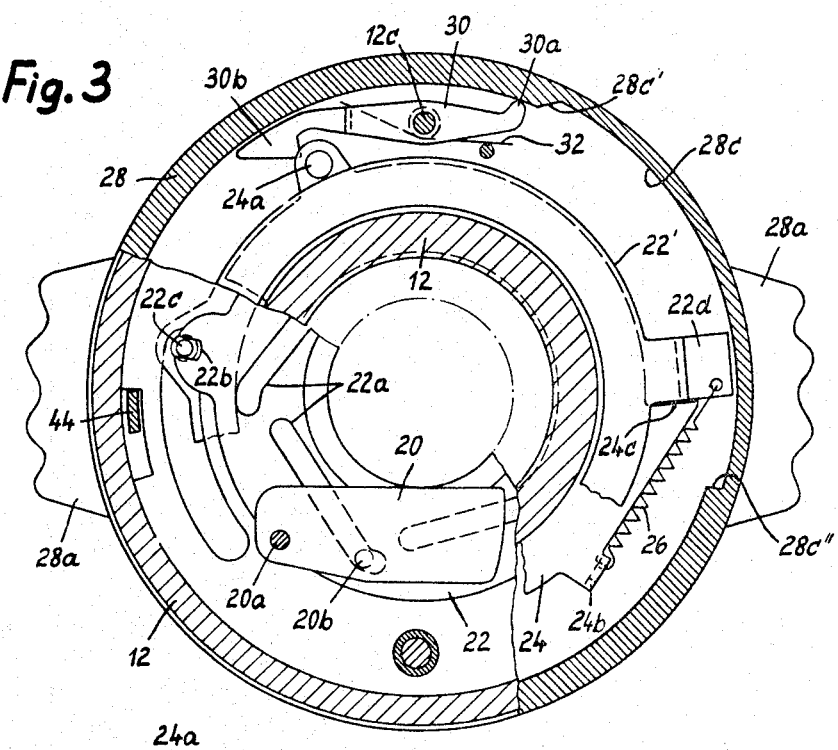
Fig. 3
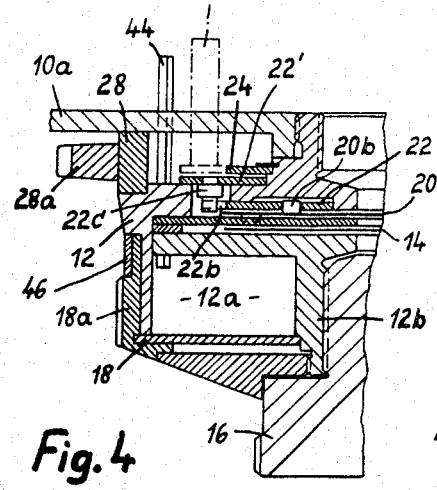
Fig. 4
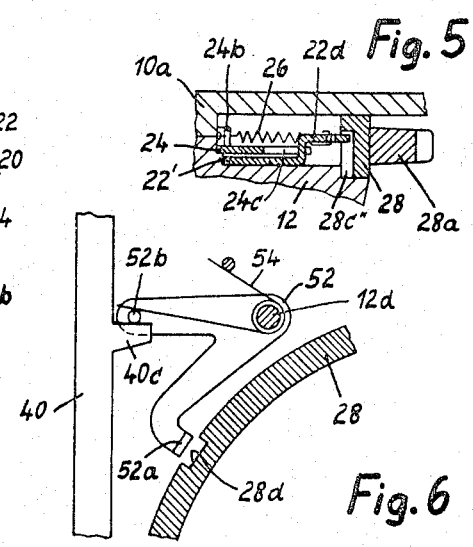
Fig. 5
Fig. 6

United States Patent Office 3,276,338
Patented Oct. 4, 1966

3,276,338
PHOTOGRAPHIC CAMERA
Franz Singer, Munich, Germany, assignor to Compur-Werk Gesellschaft mit beschrankter Haftung & Co., Munich, Germany, a firm of Germany
Filed June 5, 1963, Ser. No. 285,621
Claims priority, application Germany, June 8, 1962, C 27,201
11 Claims. (Cl. 95—10)

This invention relates to a photographic camera, and more particularly to a camera having provision for automatic adjustment of one or more of the exposure factors.

An object of the invention is the provision of a generally improved and more satisfactory camera.

Another object is the provision of a camera having improved means for automatic setting of at least one factor of the exposure.

Still another object is the provision of a camera in which the automatic setting mechanism is of a very simple, compact, sturdy, and inexpensive form, while yet very satisfactory in use.

A further object in the provision of mechanism for control of at least one factor of an exposure setting, so designed that it may be operated automatically under certain conditions, and may be operated manually under other conditions.

A still further object is the provision, in such a camera, of simple interlocking mechanism to prevent a shift from automatic operation to manual operation at a time when the parts are in an inappropriate position for such shift.

These and other desirable objects may be attained in the manner disclosed as an illustrative embodiment of the invention in the following description and in the accompanying drawings forming a part hereof, in which:

FIG. 3 is a vertical section through part of the mechanism, taken on a plane transverse to the optical axis, with parts broken away and parts omitted;

FIG. 4 is a fragmentary radial section through the mechanism;

FIG. 5 is a fragmentary horizontal section illustrating certain details; and

FIG. 6 is a fragmentary vertical section illustrating additional details.

Figure 1:
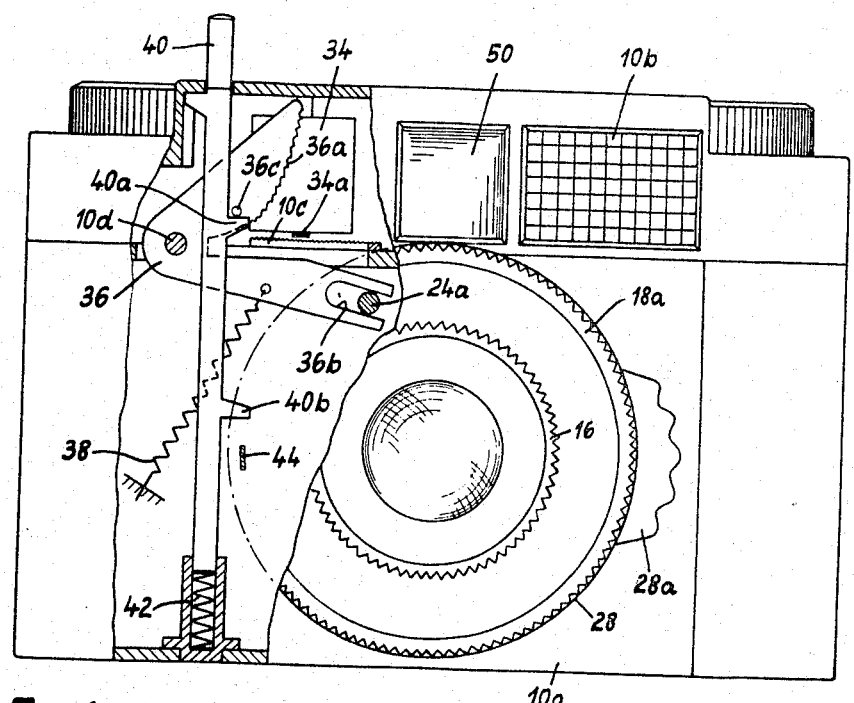
FIG. 1 is a front elevation, with parts broken away and parts in section, of a camera in accordance with a a preferred embodiment of the invention.

Referring now to the drawings, an illustrative embodiment of the invention is shown as applied to a camera which is in general of known or conventional construction, comprising a main body portion 10 having a front wall 10a to which is attached a housing or casing 12 of the usual annular shape, containing an objective shutter and a suitable diaphragm mechanism. In the annular space 12a encircling the optical axis is mechanism of any known form for operating the shutter blades schematically shown at 14. A focus adjusting ring 16 of conventional kind projects from the front of the assembly and is integral with or operatively connected to a lens mounting tube containing one or more lens components or elements.

A diaphragm, preferably of the iris type, is also mounted in the housing 12, and has any desired number of diaphragm leaves, only one of which is shown at 20, for the sake of simplicity of illustration. Each diaphragm leaf is pivoted on its own individual stationary pivot 20a, and has an operating or control pin 20b engaging in a control slot 22a in a ring 22 which is mounted in the housing 12 for rotation about the optical axis as a center. The ring 22 is coupled to another ring 22' concentric therewith, for rotary movement in unison, by means of a slot 22b in the ring 22 engaged by a pin 22c on the ring 22'. Since the rings 22 and 22' turn in unison because of the pin and slot connection, they may be collectively referred to as an operating ring or setting ring.

The operating ring or control ring mechanism 22 and 22' serves to control or set at least one of the exposure value factors of diaphragm aperture and shutter speed. For purposes of the present invention, it does not matter whether the rotating ring mechanism 22 and 22' sets only the diaphragm aperture or sets only the shutter speed, since rotating rings for setting shutter speed and rotating rings for setting diaphragm aperture are well known in the art, or whether the ring mechanism 22 and 22' sets both of the factors of diaphragm aperture and shutter speed simultaneously, since it is well known in the art to couple both of these factors to each other for simultaneous setting, as disclosed for example in United States Patents 2,969,004, granted January 24, 1961, and 3,044,-377, granted July 17, 1962, and 3,071,058, granted January 1, 1963, all for inventions of Kurt Gebele. Merely as an illustrative example, the ring mechanism 22 and 22' is here shown as setting the diaphragm aperture, by means of the slots 22a acting on the pins 20b of the diaphragm leaves. If the shutter speed mechanism is not coupled to the diaphragm aperture mechanism to be set automatically therewith, the shutter speed may be set in the conventional manner by manual operation of the speed setting ring 18a mounted for rotation on the outside of the casing or housing 12, and suitably coupled to the internal speed control cam 18 of conventional construction.

Mounted behind the portion 22' of the operating ring or setting ring mechanism is another ring 24, which may conveniently be called the transmission ring, and which is seated on a shoulder near the rear of the housing 12, for rotation about the optical axis as a center, concentric with the rings 22 and 22'. This ring 24 carries a pin 24a which projects rearwardly through a suitable slot in the front wall 10a of the camera body 10, to a posiiton within the camera body. The ring 24 also has a lateral arm or ear 24b, and a radial projection 24c spaced somewhat from the ear 24b in a circumferential direction. A spring 26 has one end connected to the ear 24b, and its other end connected to an axially offset arm 22d on the ring 22'. The tension of the spring 26 tends to turn the ring 22' in a clockwise direction when viewed from the front as in FIG. 3, and to turn the ring 24 in a counterclockwise direction, thereby holding the arm 22d of the ring 22' engaged with the projection or abutment 24c on the ring 24, as seen in FIGS. 3 and 5.

A manual setting ring 28 is rotatably mounted on the rear portion of the shutter housing 12, concentrically with the optical axis, and is equipped with two finger grips 28a which may be grasped for easy turning. The ring 28 also carries a diaphragm aperture scale 28b circumferentially graduated in the conventional f numbers, and near one end of the aperture scale, an indication or graduation A. The graduations on the ring 28 (including the designation A as well as the f numbers of the scale 28b) are read with relation to the reference mark 48 marked on a stationary part of the shutter housing 12, which reference mark 48 serves also for reading the conventional shutter speed graduations on the shutter speed setting ring 18a, when such graduations are provided.

Within the space enclosed by the setting ring 28 there is a latch lever 30 (FIG. 3) pivotally mounted on a fixed pin 12c. The latch lever 30 is biased in a counterclockwise direction by a spring 32, which tends to move the tail 30a of the lever in an outward direction to keep it engaged with the inner surface of the setting ring 28. The other arm of the lever 30 has a latching nose 30b of somewhat hook shape, for cooperation, in a manner further described below, with the previously mentioned pin 24a on the transmission ring 24. For controlling the position of the latching lever 30, the inner face of the setting ring 28 is shaped as shown in FIG. 3, having a recess 28c, at the counterclockwise end of which recess there is an inclined cam portion 28c'. At the other or clockwise end of the recess 28c, there is a shoulder or abutment 28c'', for cooperation under certain circumstances with the radial arm 22d on the ring 22'.

A photoelectric exposure meter of known form is built into the upper part of the camera body 10, with the photocell unit thereof arranged behind the window 10b. Electrically connected to the photocell unit in the conventional manner is the meter mechanism 34 of known construction, such as a moving coil galvanometer equipped with a pointer 34a which swings over a stationary clamping jaw or support 10c. Associated with the pointer 34a is a detector or feeler device comprising a lever 36 having two arms at an angle to each other somewhat like the letter V, pivoted to swing on a fixed pivot 10d near the junction of the two arms. A spring 38 suitably fixed at one end and having the other end connected to the lever 36, tends to move the lever 36 in a clockwise direction on the pivot 10d.

The first arm of the lever 36 is formed as a detector cam having a series of steps 36a selectively engaging the meter pointer 34a, in such fashion that the position of the pointer 34a determines the extent to which the detector lever may swing in a clockwise direction from its initial rest position, the swinging movement being stopped when one of the steps of the cam 36a comes down on top of the pointer 34a and presses the lower surface of the pointer firmly against the clamping bar 10c.

The second arm of the detector lever or bellcrank lever 36 is bifurcated or slotted at 36b and embraces a portion of the previously mentioned pin 24a which is mounted on the transmission ring 24. As above mentioned, the position of the meter pointer 34a determines the extent to which the lever 36 can swing in a clockwise direction, and through the pin and slot connection 24a, 36b, this determines the extent to which the transmission ring 24 may turn in a counterclockwise direction from its initial or rest position shown in FIG. 1.

Figure 2:
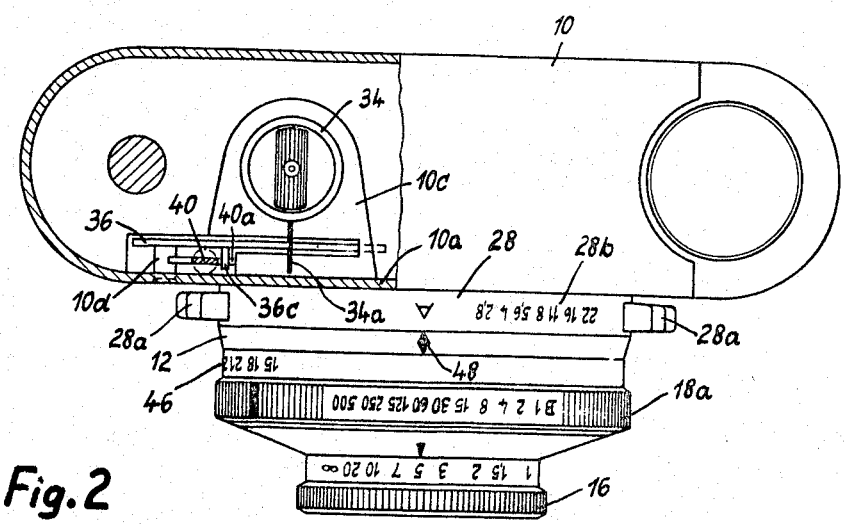
FIG. 2 is a top plan view of the same, with parts broken away and parts in horizontal section.

The detector lever 36 and the transmission ring 24 are resiliently held in their initial rest positions by means of an abutment pin 36c on the lever 36, engaging a shoulder 40a on trip slide or release plunger 40 mounted in camera body and urged upwardly to its uppermost limit position by a spring 42. The upward force exerted by the spring 42 is greater than the downward force exerted on the pin 36c by the spring 38. Therefore, the action of the springs will normally hold the plunger 40 in its uppermost position and hold the detector lever 36 in its extreme counterclockwise position and hold the transmission ring 24 in its extreme clockwise position. But if manual pressure is applied to the projecting upper end of the plunger 40, to move it downwardly against the force of the spring 42, this relieves the upward pressure of the shoulder 40a on the pin 36c and thus allows the spring 38 to swing the detector lever 36 in a clockwise direction as far as permitted by the position, at that moment, of the meter pointer 34a, thereby causing the transmission ring 24 to turn in a counterclockwise direction to a position dependent upon the position of the meter pointer 34a. The action just described will take place if the manual setting ring 28 is in the "automatic" position illustrated in FIGS. 2 and 3, with the graduation A on the ring 28 opposite the index mark 48, since at this time the shape of the inner surface of the ring 28 holds the tail 30a of the latch 30 in the position shown in FIG. 3, where it does not interfere with the above described movement of the lever 36 and the transmission ring 24 under the influence of the spring 38.

As the transmission ring 24 turns in a counterclockwise direction during the operation just described, the operating ring or setting ring mechanism 22, 22' turns with it, because of the engagement of the shoulder 24c on the transmission ring 24 with the arm 22d on the ring 22'. Thus the operating or setting ring mechanism 22, 22' is turned to a position dependent upon the position of the exposure meter pointer 34a, thereby setting whatever exposure factor is to be set or controlled by the ring 22, 22'. As the downward movement of the plunger 40 continues, and after the setting movement has been performed, a second shoulder 40b on the plunger 40 engages the conventional shutter release schematically shown at 44 (FIGS. 1 and 3) to trip the shutter for making an exposure. Upon the conclusion of the exposure, when the downward finger pressure on the plunger 40 is released, the spring 42 restores the plunger upwardly to its initial position, and the shoulder 40a thereon moves the pin 36c upwardly to restore the detector lever 36 in a counterclockwise direction, against the action of the spring 38, thereby restoring the transmission ring 24 in a clockwise direction to its initial position, and simultaneously restoring the rings 22, 22' in a clockwise direction to their initial rest position, since the spring 26 keeps the parts 22d and 24c engaged with each other.

Those skilled in the art will recognize that the film speed factor, and also the shutter speed factor (if shutter speed is not set from the operating ring mechanism 22, 22') and any other desired factor which should be taken into account, can be fed into the mechanism by using a variable resistance in the electrical circuit of the exposure meter, as disclosed for example in the above mentioned United States Patent 3,071,058, column 10, lines 40–44. As above mentioned, shutter speed (if not set by the ring mechanism 22, 22') may be controlled by the ring 18a, and film speed or sensitivity may be set by rotating the film speed ring 46.

From what has been said above, the action of the parts will be readily understood, when performing automatic setting of whatever exposure factors (e.g., diaphragm aperture alone, or diaphragm aperture plus shutter speed, or shutter speed alone) are to be set by the rotation of the ring mechanism 22, 22'. During the automatic setting it is possible, by conventional means, to have the position of the meter pointer 34a visible, by reflection, in the viewfinder 50, in conjunction with a suitable scale, so as to give a pre-indication as to whether the exposure factors are suitable for the particular purposes of the photographer. If observation of the meter pointer shows that the factor or factors which would be set automatically are not suitable for the particular purposes of the photographer, then he may resort to manual setting rather than automatic setting, and a somewhat different action takes place.

Let it be assumed that the factor which the mechanism sets automatically is the factor or diaphragm aperture, and that in this instance the automatically set value thereof is not suitable for the photographer's purposes, so that he desires to set the same manually. The grasps the finger grip portions 28a on the setting ring 28 and turns this ring counterclockwise (when viewed from the front as in FIG. 3) to remove the automatic graduation A (FIG. 2) from a position opposite the index mark 48, and to place any desired aperture graduation of the scale 28b opposite the index mark 48. This counterclockwise rotation of the setting ring 28 brings the recessed part 28c of the inner face of the setting ring opposite the tail 30a of the latch 30, thereby allowing the spring 32 to swing the latch counterclockwise on its pivot 12c, so that the nose 30b of the latch engages the pin 24a and prevents the pin and the transmission ring 24 from moving counterclockwise from their initial rest positions. Then the continued counterclockwise motion of the ring 28 brings the abutment shoulder 28c'' into engagement with the arm 22d on the ring 22', and carries the ring 22' (and with it, the ring 22) in a counterclockwise direction to an extent determined by the distance through which the setting ring 28 is manually rotated. During this movement, the spring 26 stretches, since the ring 24 is not able to follow the counterclockwise rotation of the rings 22 and 22', because of the action of the latch 30.

When the manual setting by rotation of the ring 28 has been completed, the operator depresses the plunger 40 to make the exposure. The shoulder 40a moves downwardly away from the pin 36c on the detector lever or feeler lever 36, but this lever 36 cannot move at this time under the inuflence of its spring 38, because of the action of the latch 30 in holding the transmission ring 24 against rotation. Near the end of the downward movement of the plunger 40, the shoulder 40b engages the shutter trip or shutter release member 44, and initiates the actual exposure operation of the shutter, in conventional manner.

As shown in FIG. 6, a special latch may be provided to prevent movement of the manual setting ring 28 at an inappropriate time. Whenever the plunger 40 is in a depressed position (either partially or fully depressed) the manual setting ring 28 should not be moved from its automatic position to one of its other positions, because the detector lever 36 and the transmission ring 24 will have moved away from their normal initial positions and the pin 24a can no longer be engaged by the nose 30b of the latch lever 30. To prevent any such improper movement of the manual setting ring 28, there may be provided, as shown in FIG. 6, the double arm latch lever 52, mounted on a stationary pivot 12d. One arm of this lever has an ear 52a adapted to drop into the latching notch 28d under the influence of a spring 54 which tends to turn the lever 52 in a counterclockwise or latching direction. The other arm of the lever has a pin 52b which overlies a shoulder 40c on the plunger 40. When the plunger is in its uppermost position, it raises the pin 52b so as to hold the ear 52a out of the notch 28d, thereby allowing the manual setting ring 28 to be turned from automatic setting position to any of the manual setting positions. But as soon as the downward movement of the plunger 40 commences, the latching lever 52 is free to turn in a counterclockwise direction and if the setting ring 28 is still in the automatic position, the latching lever will drop into the notch 28d and prevent the ring 28 from being moved out of the automatic position, until the plunger 40 returns once more to its uppermost position. If, as the time the plunger 40 is depressed, the ring 28 has already been moved from automatic position to one of the manual positions, then the ear 52a on the latching lever 52 will simply engage the smooth periphery of the ring 28 and will not interfere with further shifting of the ring 28 to a different manual setting position, if a change in setting is desired at the last moment, after the operator has already begun to depress the plunger 40.

The setting mechanism according to this invention has the advantage that the coupling spring 26 between the setting members 22' and 24 is not operative during automatic setting, and thus requires no increase in the force required for performing automatic setting. Therefore, automatic setting can be performed by the power of a relatively light spring 38, since this spring does not have to overcome the force of any other spring, but only needs to overcome the inherent friction of the various parts which must be moved during automatic setting. When performing manual setting, on the other hand, the spring 38 is ineffective and does not have to be overcome by manual means, and only a small expenditure of effort is required to overcome the action of the coupling spring 26 during the performance of manual setting. Hence in either case, both automatic and manual, setting can easily be accomplished with the required sensitivity.

It has been mentioned that the two rings 22 and 22' which together constitute the operating ring mechanism or setting ring mechanism, are coupled to rotate together as a unit. Thus for operational purposes they constitute, in effect, a single ring. But there is a constructional advantage in making them as two separate rings as illustrated, as this tends to reduce the transmission, to the final operating ring 22, of any rocking or cocking or twisting displacement applied to the ring 22' by the fact that the spring 26 does not act directly in the plane of the ring 22' but is slightly offset from such plane, as seen in FIG. 5.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. Means for setting an exposure factor in a photographic camera, comprising an exposure factor control member mounted for movement, a transmission member also mounted for movement, first spring means anchored both to said control member and to said transmission member and normally coupling said transmission member and said control member to each other for joint movement, an exposure meter including a movable pointer, second spring means tending to move said transmission member to a variable position dependent upon the position of said pointer, a latch for holding said transmission member in a predetermined position adjacent one end of its range of travel, and manual setting means effective in one position to render said latch inoperative so that said second spring means may move said transmission member to a position dependent upon the position of said pointer and effective upon movement to another position to render said latch operative and to move said control member manually and independently of said transmission member.

2. Means for setting an exposure factor in a photographic camera, comprising exposure factor control ring means mounted for rotary movement, a transmission ring also mounted for rotary movement concentrically with said control ring means, first spring means having one portion pressing in one rotary direction against said control ring and another portion pressing in an opposite rotary direction against said transmission ring and normally coupling said control ring means and said transmission ring to each other for joint rotary movement, an exposure meter including a movable pointer, second spring means tending to move said transmission ring from an initial position toward another position dependent upon the position of said pointer, latch means for holding said transmission ring in said initial position against the force of said second spring means, and a manual setting ring rotatable from an automatic setting position to any one of a series of manually set positions, said manual setting ring serving to render said latch means ineffective when said manual setting ring is in its said automatic setting position and serving to render said latch means operative to hold said transmission ring and also serving, when said manual setting ring is rotated to a selected one of its manually set positions, to move said control ring means to a corresponding one of said series of set positions.

3. A construction as defined in claim 1, wherein said second spring means includes a pivotally mounted detector lever adapted to swing into contact with said movable pointer and to be stopped thereby at a variable position dependent upon the position of said pointer, and an operative connection between said detector lever and said transmission member.

4. A construction as defined in claim 2, wherein said second spring means includes a pivotally mounted detector lever having two arms, one of said arms being adapted to swing into contact with said movable pointer and to be stopped thereby at a variable position dependent upon the position of said pointer, the other of said arms of said detector lever being operatively connected to said transmission ring.

5. A construction as defined in claim 4, further including a shutter release member movable from a rest position to an operated position, cooperating parts on said release member and said detector lever for swinging said detector lever to an initial position by movement of said release member to its rest position, and a spring tending to move said release member to its rest position, said spring having sufficient power to overcome the force of said second spring means tending to move said detector lever away from its initial position.

6. A construction as defined in claim 5, further including a second latch for latching said manual setting ring in its automatic setting position, and means operated by movement of said shutter release member to its rest position for releasing said second latch.

7. A construction as defined in claim 4, wherein said second spring means tends to move said detector lever away from an initial position, further including a second latch for latching said manual setting ring in its automatic setting position, and means functionally coupled to said detector lever for releasing said second latch upon movement of said detector lever to its initial position.

8. A construction as defined in claim 2, in which said control ring means includes a first ring and a second ring operatively connected to turn in unison, said first spring means tending to hold said first ring in a predetermined position of orientation with respect to said transmission ring, said second ring constituting a diaphragm aperture control ring.

9. A construction as defined in claim 8, wherein said manual setting ring has a cam surface for controlling said latch means and has an abutment shoulder for engaging said first ring to turn said first ring against the force of said first spring means when said manual setting ring is turned away from its automatic setting position.

10. Means for setting an exposure factor in a photographic camera, comprising an exposure factor control ring mounted for rotation and effective, upon rotation, to set an exposure factor, a transmission ring mounted for rotation concentrically with said control ring, cooperating abutment parts on the two rings to limit the rotation of one ring relative to the other in one direction, spring means operatively connected to both of said rings to tend to turn one ring relative to the other to the limit position determined by said abutment parts, exposure meter controlled means for turning said transmission ring from an initial position in a direction to keep said abutment parts engaged with each other so that the turning of said transmission ring turns said control ring with it to position said control ring in accordance with an indication given by an exposure meter, a movable latch for latching said transmission ring in its said initial position, and a manually operable setting member rotatable concentrically with said rings, said setting member having a cam portion for rendering said latch ineffective when said setting member is in one position and rendering said latch effective when said setting member is in a range of other positions, said setting member also having an abutment spaced from a portion of said control ring when said setting member is in said one position and so arranged that when said setting member is rotated from said one position to said range of other positions, said abutment on said setting member will engage said control ring and turn said control ring while said transmission ring is held by said latch, thereby moving said abutment parts of the two rings away from each other and tensioning said spring means.

11. A construction as defined in claim 10, wherein said abutment parts on the two rings comprise a radial arm on said control ring and a radial shoulder on said transmission ring for engaging said radial arm, wherein said spring means comprises a coil tension spring having one end connected to said radial arm and another end connected to said transmission ring at a point such that the force of said tension spring tends to keep said shoulder engaged with said arm, and wherein said setting member is hollow and said abutment on said setting member is in the form of an internal shoulder which engages said arm on said control ring when said setting member is turned to said range of other positions to carry said control ring along with said setting member while said transmission ring remains latched in its initial position by said latch, meanwhile tensioning said coil tension spring as said arm on said control ring is carried away from said shoulder on said transmission ring.

References Cited by the Examiner
UNITED STATES PATENTS

| | | | |
|---|---|---|---|
| 3,037,437 | 6/1962 | Rentschler | 95—10 |
| 3,095,791 | 7/1963 | Richter | 95—10 |
| 3,106,882 | 10/1963 | Maitani | 95—10 |
| 3,127,822 | 4/1964 | Kiper | 95—10 |
| 3,199,425 | 8/1965 | Starp | 95—10 |

NORTON ANSHER, *Primary Examiner.*

W. E. JACKSON, *Assistant Examiner.*